United States Patent [19]

Armstrong et al.

[11] 4,069,712
[45] Jan. 24, 1978

[54] THERMOSTAT SETTING DIAGNOSTICS FOR INTERNAL COMBUSTION ENGINE

[75] Inventors: Lee R. Armstrong, Enfield; Henry E. Goetsch, Broadbrook; Henry J. Mercik, Jr., Enfield, all of Conn.

[73] Assignee: United Technologies Corporation, Hartford, Conn.

[21] Appl. No.: 781,091

[22] Filed: Mar. 25, 1977

[51] Int. Cl.² .............................................. G01M 15/00
[52] U.S. Cl. ......................................... 73/118; 73/347
[58] Field of Search ...................... 73/347, 118, 117.3, 73/116; 123/41.15

[56] References Cited

U.S. PATENT DOCUMENTS

| 3,262,314 | 7/1966 | Gregg | 73/347 X |
| 3,292,427 | 12/1966 | Mattson | 73/118 |
| 3,302,171 | 1/1967 | Sensing | 123/41.15 UX |

Primary Examiner—Jerry W. Myracle
Attorney, Agent, or Firm—M. P. Williams

[57] ABSTRACT

Electronic processing means are utilized in a composite measurement of performance of an engine cooling system thermostat, with diagnostic procedures to ensure viable measurement. The speed of the engine is initially tested to ensure the engine is at high idle speed, so that temperature in the cooling system will increase to that at which the thermostat will normally operate; and during the testing, the speed is continuously monitored to be sure it remains close to the initial test speed (near high idle) to minimize coolant pump pressure variations due to engine speed. Three temperature diagnostics are performed to ensure a viable test: first, if the temperature ever exceeds 15° over the rated thermostat temperature, the test is terminated in a fault since the thermostat is presumed to be stuck in the closed position; second, if the temperature fails to increase by at least 2° for each 2 minutes of operation above rated speed, the test is terminated in a fault since it is assumed that the thermostat is stuck in the open position; third, if the test is not completed within 5 minutes after the temperature reaching 5° less than the rated thermostat temperature, the test is terminated in a fault since the thermostat operation is too imprecise to reliably perform the measurements of the operation (such as laggardly or stuck partially open). The actual thermostat operation measurements are the highest temperature reached before sensing either a temperature drop of 2° below the highest temperature sensed theretofore, or sensing a pressure drop of 5 psi below the highest pressure sensed theretofore.

25 Claims, 6 Drawing Figures

THERMOSTAT SETTING DIAGNOSTICS FOR INTERNAL COMBUSTION ENGINE

CROSS REFERENCE TO RELATED APPLICATIONS

The apparatus disclosed herein may utilize a cylinder identification centering means disclosed and claimed in a commonly owned, copending application Ser. No. 684,221, ENGINE, CYLINDER IDENTIFICATION (CID) TRANSDUCER, filed on May 7, 1976 by Tedeschi now U.S. Pat. No. 4,043,189, and may determine the number of teeth on a flywheel for speed measurements in accordance with a commonly owned, copending application Ser. No. 684,037, DETERMINATION OF NUMBER OF TEETH ON AN INTERNAL COMBUSTION ENGINE FLYWHEEL, filed on May 7, 1976 by Stick et al now U.S. Pat. No. 4,015,466, or Ser. No. 747,755, WAVEFORM COUNT OF TEETH ON AN INTERNAL COMBUSTION ENGINE FLYWHEEL, filed on Dec. 6, 1976 by Pettingell et al.

FIELD OF ART

This invention relates to electronic vehicle diagnostics, and more particularly to measurement of thermostat operation in the cooling system of an internal combustion engine.

BACKGROUND OF THE INVENTION

Various tests have been used to determine the operating condition of the thermostat in the cooling system of internal combustion engines. Conceptually, the simplest of these tests involves removal of the thermostat from the cooling system, placing it in a heated pan of liquid with a thermometer, and visually observing mechanical motion indicative of opending of the thermostat and the temperature at which it occurred. Naturally, this test is unsatisfactory since it requires the breaking of a liquid seal and an off-vehicle test, and the potential for fouling operation on reinstallation; and the temperature may not vary sufficiently to use it as a visual indication of operation. For certain cooling systems, in dependence upon the overall parameters thereof, it has been known to visually monitor temperature and pressure gages affixed to the cooling system essentially at the thermostat housing, to determine the indicated temperature at which an apparent pressure drop seems to be signaling the opening of the thermostat. However, in some systems, the pressure drop is not sufficiently significant so as to be a viable test, particularly when done visually. And, the pressure may vary due to other factors sufficiently to mask the anticipated indication.

In modern vehicle diagnostics, it is desirable to be able to measure as many parameters as possible without removing parts from the engine, and with a minimum of attachments to the engine. When complex diagnostics are involved, it is desirable that the diagnostic equipment be operative to test the widest variety of vehicles and/or engines. Similarly, automated diagnosis is feasible in a practical sense only if the versatility and simplicity of performance of the test permit cost savings as well as providing reliable measurement information about the vehicles and/or engines under test.

SUMMARY OF THE INVENTION

Objects of the present invention include improved diagnostic measurement of the operating characteristics of a vehicle engine cooling system thermostat, and provision of thermostat measurements which are universally applicable to a wide variety of cooling systems.

According to one aspect of the present invention, a measurement of the operation of a thermostat, which may be the temperature at which a cooling system thermostat operates, is made in response to measurement of either a temperature drop or a pressure drop in the cooling system. In further accord with this aspect of the invention, successive temperatures and pressures are sensed, and each value higher than previously sensed values is saved for comparison with successive ones; the present temperature and pressure are compared with the last saved values thereof to determine whether a sufficient threshold value of temperature drop or of pressure drop has occured so as to be indicative of thermostat operation; and further, the temperature at which either the presssure or temperature drop occurs is taken as the measured reading of thermostat operation.

According to another aspect of the invention, the measurement of operation of a thermostat by sensing a change in a coolant parameter is terminated in response to diagnostic tests indicating the likelihood that such change will not occur. In accordance further with this aspect of the present invention, a test is made to ensure that the thermostat is not stuck open; in one form of this aspect of the invention, a check to ensure a given temperature rise per unit of time is made. In accordance further with this aspect of the present invention, a test is made to ensure that the thermostat is not stuck closed; in one form of this aspect of the invention, a test is made of the temperature of the system to ensure that it is not much over the rated thermostat temperature. In accordance still further with this aspect of the present invention, a test is performed for marginal, indistinct thermostat operation, such as being stuck partially openor laggardly; in one form of this aspect of the present invention, the test is terminated if the test is not complete within a given span of time after the temperature has approached substantially the design operating temperature of the thermostat. Viability of the tests is diagnostically assured since, inter alia, according to another aspect of the present invention, measurement of the operating temperature of a thermostat is automatically performed only if concurrent diagnostics indicate that engine speed has remained sufficiently constant so as not to induce excessive pressure variations in the cooling system. In further accord with this aspect of the present invention, the thermostat measurement is conditioned upon the engine reaching a given speed, such as high idle, and on each iteration of sensing conditions indicative of the thermostat having operated, the speed is checked to be sure that it is sufficiently close to the original speed so that speed-induced pressure variations in the system will not be excessive in contrast with a pressure drop which is to be sensed as an indication of thermostat operation.

The invention provides a viable thermostat operating temperature measurement for a wide variety of cooling systems, since it employs either temperature drop or pressure drop as an indication of thermostat operation. The invention is also useful for a viable test in a wide variety of cooling systems because of diagnostic tests of other conditions as conditions precedent to the making of the thermostat operation tests. Viability of the testing is ensured by requiring that the thermostat not be stuck either open, partly open or closed, or laggardly; and, pressure effects due to speed are mitigated by speed tests. The diagnostically assured measurements of thermostat operation in accordance with the present invention are readily incorporated into an overall, automated diagnostics system; the measurements in accordance herewith avoid the necessity of removing parts from the engine for bench tests. The invention permits fast and accurate measurement of thermostat operation without an undue amount of engine modification, parts removal and the like.

The foregoing and various other objects, features and advantages of the present invention will become more apparent in the light of the following detailed description of exemplary embodiments thereof, as illustrated in the accompanying drawing.

DETAILED DESCRIPTION

Figure 1:
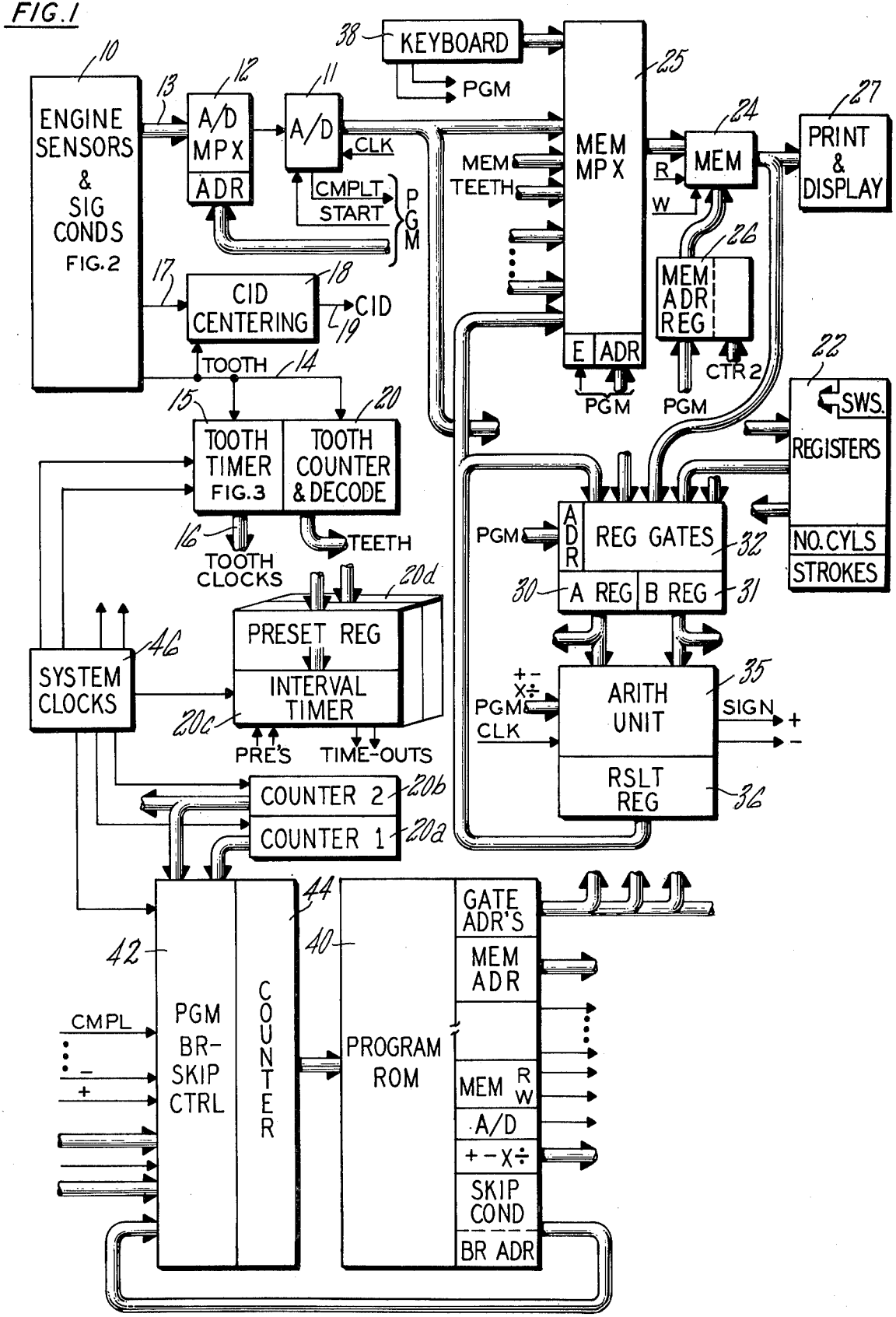
FIG. 1 is a simplified schematic block diagram of a diagnostic system including engine parameter sensing apparatus and exemplary electronic processing apparatus, in which the present invention may be incorporated.

Referring now to FIG. 1, a system which may incorporate the present invention is illustrated as representing the architecture of a typical data processing system or computer together with special purpose apparatus related to an engine diagnostic system of the type in which the invention may be incorporated. Specifically, the system incorporates engine sensors and signal conditioners 10 of a well known type which are adapted to be disposed for response to various parameters or discrete conditions or an engine under test, as described more fully hereinafter. Some of the sensors relate to pressures, temperatures and the like and are therefore analog signals, the magnitude of which is a measure of the parameter being sensed. These outputs of the sensors are fed over lines 13 to an analog to digital converted (A/D) 11 when selected by an A/D multiplexer 12 in response to a particular sensor address applied thereto by the program of the data processor. In addition, a tooth sensor may sense the passage of teeth on the flywheel of the engine to provide a tooth signal on a line 14, the intertooth time interval of which (when the engine is running) is measured by a tooth timer 15 and provided on tooth count lines 16. Another discrete signal is a cylinder or cycle identification signal (CID) on a line 17 which is applied to a CID centering circuit 18 to provide a CID signal on a line 19. The raw CID signal on the line 17 is a signal from a proximity sensor disposed to sense movement of an engine member once in each cycle of the engine, such as the rocker arm for the intake valve of one of the cylinders or a cam, if desired; this provides information of the cylinder-by-cylinder position of the engine at any moment in time in the same fashion as the number one firing in a spark ignition engine, and also provides cycle-to-cycle division of the engine's angular position as it is running or cranking.

In accordance with the invention, the parameters of the engine as provided through the A/D converter 11, and the instantaneous position with respect to the engine as provided by the CID signal on the line 17 and the tooth signals on the line 14 may be used in diagnosis of the engine in accordance with the invention herein.

Additional special apparatus which may be used (although as described hereinafter is not necessarily required) includes a tooth counter and decode circuit 20, a pair of counters 20a, 20b (counter 1 and counter 2), a pair of interval timers 20c, 20d, and special purpose registers 22, which may be used (as an alternatiive to memory) to retain certain factors that are used so often as to render it advisable to have them directly available to the program rather than having to access them in memory, in order to cut down processing time and complexity of programming. Such registers may contain factors utilized in processing data (such as multiplicands used in digital filtering of the data and the like) and information relating to the particular engine under test (such as number of strokes and cylinders) which may be entered by switches manipulated by an operator, the switches feeding binary decode circuits such that the decode constantly reflects the position of the switch on a steady state basis in the manner of a register.

The remainder of FIG. 1 is illustrative of one type of data processing apparatus, which is shown for illustrative purposes herein since it is a type that may be advantageous for use where general purpose programming is not required, but rather limited functions are to be performed. A computer, as is known in the art, includes memory (or accessible storage), and arithmetic unit, program control, and the necessary gates, data flow and event decode or monitoring circuits so as to permit advancing logically through the steps which are to be performed. Specifically, a memory 24 may be loaded from a variety of inputs shown on the data flow under control of a memory multiplexer 25 which is enabled and addressed by the program so as to select which of the possible inputs to memory are to be applied thereto, if any. The memory 24 is responsive to a memory address register 26 which may respond to a counter used in program control in a usual fashion. The output of the memory is available to other portions of the data flow, such as print and display apparatus 27 and the arithmetic apparatus including arithmetic unit input registers, referred to herein as an A register 30 and a B register 31 under control of register gates 32 which are controlled by the program in a known fashion. Herein, the output of the A register and the B register is available to the register gates 32 and to the main data flow, so that their contents may be moved between the registers 30, 31 or to the memory 24. This is to facilitate the particular type of processing which may be employed in an engine diagnostic system, as is described more fully hereinafter. The registers 30, 31 feed an arithmetic unit of a known type 35, the function of which, controlled by the program, is to add, subtract, multiply or divide, to provide answers to a result register 36 as well as providing indications of the sign of the result. As indicated in FIG.

1, the result register may be available at the input to the arithmetic unit through the gates 32; alternatively, as is common in many computers the result register could be automatically one of the inputs to the arithmetic unit, and it can be loaded directly from the memory upon a proper command.

In order to provide data inputs to the memory for initialization and to permit a degree of control over the system during processing, a keyboard 38 of a usual variety may be provided. In addition to data inputs, the keyboard may have control function keys that permit choice to the operator of loading memory from the result register or of loading memory in response to the keyboard, depending upon conditions which may be displayed in the print and display apparatus 27.

For the rather limited number of tests being performed in apparatus incorporating the present invention, the program may be controlled in a variety of ways. One way is a program ROM 40 which provides input gate addresses to control the inputs to the memory, the arithmetic input registers, and the A/D converter, etc.; the memory address; the functions to be performed by the arithmetic unit, and other commands such as commands to the memory to cause it to read or write, and to start the A/D converter 11, and the like. Sequencing is controlled by unconditional branch instructions (which provide a branch address) and by skip instructions (dependent on conditions) provided to a branch/skip control 42 at the input to the program counter 44, which is also responsive to system clocks 46. Thus, as is known, for each program clock signal received from the system clocks, the program counter may be advanced, skipped one or twice, or reset to the branch address, in dependence upon the presence of branch or skip instructions.

It should be understood that the particular processing apparatus used, and the degree of use of special purpose apparatus, is dependent upon the particular implementation of the present invention which is to be made, and forms no part of the present invention. If the invention is utilized in a complex, sophisticated diagnostic system in which a variety of diagnostic functions are required, then the type of apparatus selected for processing may be more sophisticated and capable of general purpose utilization in order to accommodate the special requirements of all of the diagnostic procedures to be performed. However, the cost of programming complexity of such a processing system may be unwarranted in a diagnostic system which performs either relatively few or relatively simple tests. As is more apparent in the light of detailed operational descriptions hereinafter, well known processing systems (such as NOVA and PDP/11) employing only programs provided through techniques well known in the art, may be utilized in conjunction with the enngine sensors and conditions 10, suitable input and output apparatus (such as keyboard 38 and the print and display apparatus 27) and, depending on the processing power of the data processing system selected, some special purpose hardware which may be found advisable, such as the tooth timer 15, the tooth counter 20 and some special registers 22. However, the well known processing systems referred to hereinbefore can provide adequate memory capacity to perform the tooth timing and counting functions, and to provide for the storage of all required parameters and engine information in the memory, as is readily apparent in those skilled in the art.

Figure 2:
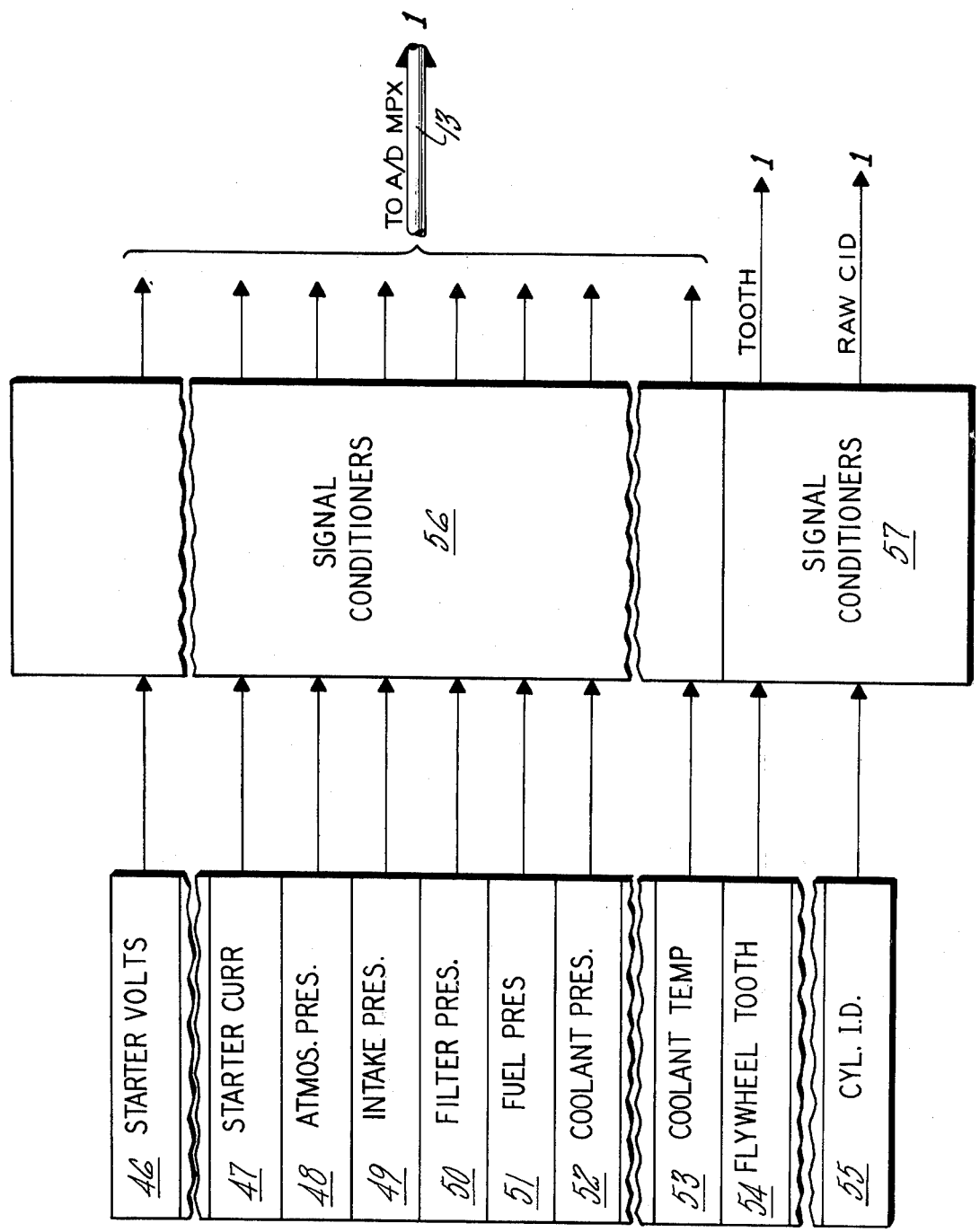
FIG. 2 is a simplified block diagram of engine parameter sensing apparatus for use in the embodiment of FIG. 1.

Referring now to FIG. 2, a plurality of engine sensors in a diagnostic system incorporating the present invention may include, among others not shown in FIG. 2, a starter voltage probe or clamp 46, a starter current probe 47, an atmospheric pressure transducer 48, which could be disposed in general proximity to the engine under test, a pressure transducer 49 to measure the intake manifold air pressure, a filter pressure transducer 50 to measure the pressure of the fuel downstream of the fuel inlet filter, a fuel pressure transducer 51 to measure the pressure at the fuel injector inlet rail of the engine, a coolant pressure transducer 52 which may preferably measure the pressure of coolant at the inlet to the coolant thermostat, a coolant temperature transducer 53 to measure coolant temperature, preferably at the inlet to the thermostat. In a diagnostic system incorporating the present invention there may also be a proximity sensor 54, which may comprise an RGT Model 3010-AN Magnetic Proximity Sensor, provided by Electro Corporation, Sarasota, Fla., for sensing the passage of flywheel teeth past a particular point adjacent to the flywheel housing, and a proximity sensor 55 such as a Model 4947 Proximity Switch distributed by Electro Corporation, for sensing the presence of an engine member which moves in a unique fashion once in each cycle of the engine, which is one revolution in a two stroke engine or two revolutions in a four stroke engine. The proximity sensor 55 may preferably be mounted through the valve cover adjacent to a rocker arm related to the intake valve of one of the cylinders of the engine, thereby to provide information as to the particular point of an engine cycle once in each cycle, as well as to delineate successive engine cycles as the engine is rotating.

Each of the sensors of FIG. 2 is applied to a suitable one of a plurality of signal conditioners 56, 57 to filter out unwanted noise, and to provide, through an amplifier, suitable level adjusting as is appropriate for the circuitry being fed thereby. For instance, the signal conditioners 56 scale the signals to the proper level so that each of them can be fed through a common A/D converter 12 (FIG. 1). The signal conditioners 56, 57 can be suitable ones of a wide variety known in the art, and form no part of the present invention.

Figure 3:
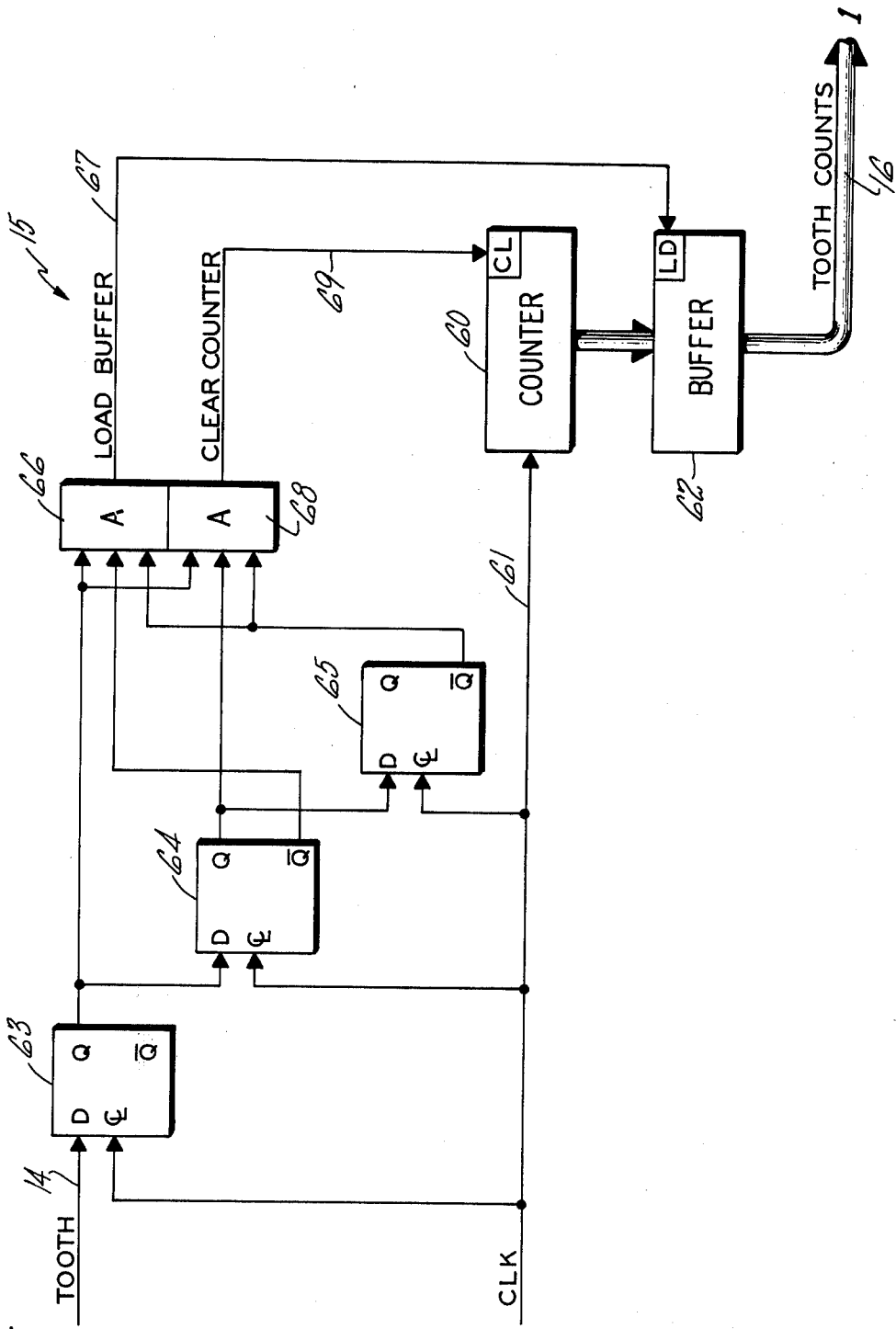
FIG. 3 is a simplified schematic diagram of tooth timer means for obtaining instantaneous, sub-cyclic engine speed in the embodiment of FIG. 1.

Referring now to FIG. 3, the tooth timer 15 includes a counter 60 which repetitively counts clock pulses on a line 61 that may be supplied by system clocks 46 in FIG. 1. The counter is parallel-fed to a buffer 62, the output of which comprises the tooth counts. The counter is running substantially all of the time since a very high frequency clock signal can be utilized on the line 61 (anywhere from tens of KHz to tens of MHz) whereas at speeds from 300 rpm to 2,000 rpm the frequency of the tooth signals on the line 14 may be on the order of 10 Hz to 100 Hz, depending upon the number of teeth. Thus the few clock signals lost during the tooth to tooth resetting of the counter are miniscule.

Each time that a tooth signal appears on the line 14, the next clock signal will set a D-type flip flop 63, the Q output of which is applied to a D-type flip flop 64. The second clock signal following the tooth signal therefore sets the D-type flip flop 64, and since its Q output is applied to a D-type flip flop 65 the third clock signal will cause it to become set. The very first clock signal, after the appearance of the tooth signal, is decoded by an AND circuit 66 since it responds to Q of flip flop 63 and not Q of flip flops 64 and 65; this provides a load buffer signal on a line 67 to cause the buffer 62 to be loaded in parallel from the counter 60. The second clock signal following the appearance of the tooth signal will cause an AND circuit 68 to respond to the Q of flip flops 63 and 64 and the not Q of flip flop 65 so as to generate a clear counter signal on a line 69 which is applied to the clear input of the counter 60 causing it to be cleared to zero. The third clock signal, by setting the flip flop 65, simply eliminates the clear counter signal on the line 69 so that the next leading edge of the clock signal and all subsequent clock signals will be counter in the counter 60. Whenever the tooth signal disappears, (which is totally immaterial) the next three clock signals in a row will cause resetting of the flip flops 63–65, in turn, since each of their D inputs will go down. The counter and the buffer are independent of the resetting of the flip flops 63–65 since both AND circuits 66, 68 operate only during a progression with flip flop 63 on and flip flop 65 off, which does not occur during the resetting of the flip flops.

Thus the tooth timer 15 provides tooth counts on the line 16 which are stable, throughout substantially each intertooth interval. The processing apparatus of FIG. 1 may therefore sample the tooth counts at random. The tooth timer 15 thereby provides very accurate, subcyclic speed measurement, on a tooth to tooth basis, which provides speed indications many times within each individual cylinder stroke portion of each engine cycle.

In the detailed description of exemplary processing hereinafter, the term "ringgear" is sometimes used in place of "flywheel"; they mean the same thing; the abbreviation "RGT" means "ringgear teeth," a stored factor indicating the number of teeth on the flywheel of the engine under test. This may be determined and entered from engine specifications, or as set forth in a commonly owned copending application of Stick et al, Ser. No. 684,037, entitled DETERMINATION OF NUMBER OF TEETH ON AN INTERNAL COMBUSTION ENGINE FLYWHEEL. Other abbreviations include: "RSLT" = result register; "MEM" = memory; "Ctr" = counter; "Factor" means a memory location or a register where the factor is available; "CMPLT" means A/D conversion is completed; "spd" means speed; and other abbreviations are apparent in the drawing. Parentheticals after "MEM," such as "(Freq)" indicate addresses, chosen at will by the programmer, or partially determined by counter two, if so indicated.

Figure 4:
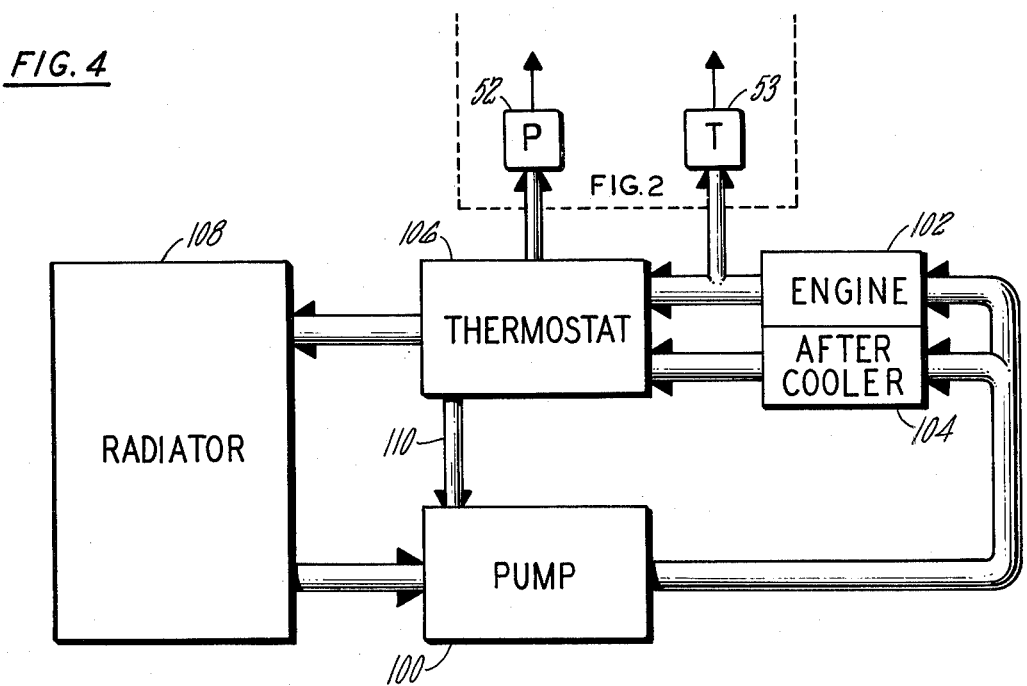
FIG. 4 is a simplified block diagram of an engine cooling system with pressure and temperature transducers mounted thereon for tests in accordance with the present invention.

Referring now to FIG. 4, a typical cooling system for a vehicle mounted engine includes a pump 100 for circulating the coolant through the system, coolant passages in the engine 102 and in some cases an after cooler 104, a thermostat housing in which a thermostat 106 is mounted to control the flow of coolant through a radiator 108 (when the coolant is hot) or force it through a bypass 110 when the coolant is cold. Since the radiator 108 and bypass 110 together provide a lesser restriction to flow when the thermostat is open than does the bypass 110 alone when the thermostat is closed, there is generally a pressure drop which occurs when the thermostat opens. However, this pressure drop may or may not be reliably significant for use as an indication of the thermostat opening in an automated diagnostic system, in dependence upon the particular cooling system in which the thermostat is mounted. For the test herein, the pressure sensor 52 may be disposed through a tap in the thermostat housing so as to measure the pressure just upstream of the thermostat; similarly, the temperature transducer 53 may be mounted so as to sense the temperature of coolant between the engine and the thermostat; however, these sensors may be mounted almost anywhere in the system, in almost any cooling system configuration, so long as the variations therein are utilized properly, as described more fully hereinafter.

Figure 5:
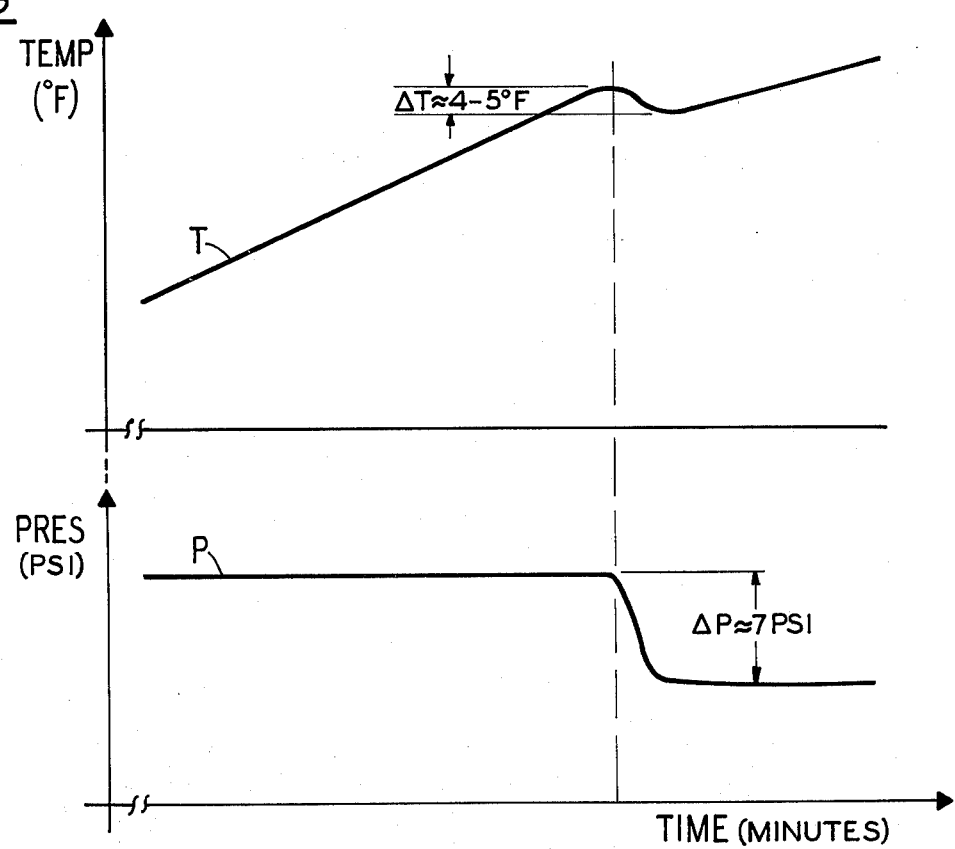
FIG. 5 is a chart illustrating temperature and pressure on a common time base in a normal engine, warming up to thermostat operating temperature.

In FIG. 5, the temperature and pressure characteristics of a typical cooling system with sensors placed as shown in FIG. 4 are indicated, although the pressure characteristics are indicated for systems having a fairly well defined pressure drop as a consequence of the thermostat opening (which is not always the case). Certainly the characteristics will vary from cooling system to cooling system, some providing a greater temperature differential to be sensed, other providing a greater pressure differential to be sensed. In any event, it is seen in FIG. 5 that normal operation includes an increase in temperature until the operating temperature of the thermostat is reached, following which the thermostat will open and a slight drop in temperature will thus ensue; at the same time, there will be some drop in pressure upon thermostat opening. By holding the speed relatively constant in the engine as it warms up, the pressure will remain substantially constant before and after thermostat opening, being somewhat lower after the thermostat is opened.

When testing cooling systems in which the temperature drop is not of measurable significance in determining thermostat operation, the temperature sensor can be mounted almost anywhere in the system other than in the radiator or its flow lines; and then it can be used for diagnostic determination that the thermostat is not stuck in the open or closed position, nor is marginal, as referred to briefly hereinbefore. A unit temperature rise per unit of time prior to thermostat opening, ensures that the thermostat is not stuck in the open condition; that the temperature does not exceed the nominal thermostat operating temperature ensures that the thermostat is not stuck in the closed position; and the test is completing the measurement within some finite period of time after the design operating temperature of the thermostat has been almost reached, ensures that the thermostat is not stuck partially open nor so laggardly as to render any testing thereof to be unreliable. As indicated hereinbefore, if the speed is not maintained relatively constant prior to thermostat opening, then pressure variations due to coolant pump speed variations can exceed those which may be indicative of thermostat operation due to decrease in flow resistance.

Figure 6:
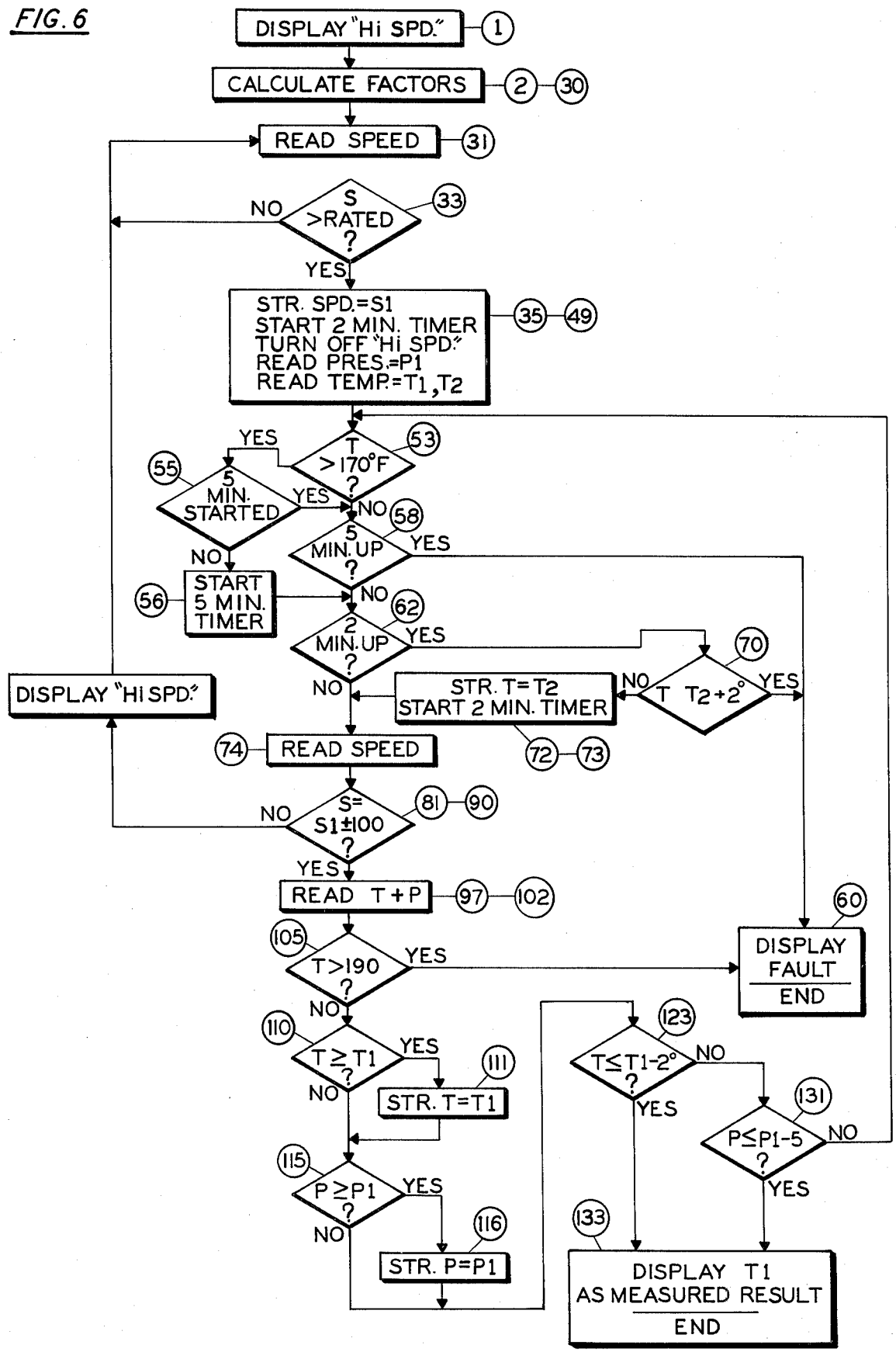
FIG. 6 is a logic flow diagram illustrating processing steps which may be incorporated in the exemplary embodiment of the invention disclosed herein.

The present invention is described herein in conjunction with signal processing apparatus, which may take a variety of well known forms, and which lends the invention to incorporation in an overall diagnostic system in which many tests and measurements may be rapidly made upon the engine and/or accessories of a vehicle. Exemplary processing steps, which are described briefly in the data flow chart of FIG. 6, are described hereinafter. It should be understood that these steps are indicative of functions to be performed, and the particular manner of performing all of the functions, including the details thereof and the order in which they may be performed, may vary widely in dependence upon the processing apparatus chosen for any implementation of the present invention.

In order to make the thermostat measurements of the invention, and to perform the diagnostic tests to assure viability of the measurements as described hereinbefore, the exemplary operation of typical processing apparatus given hereinafter presumes that factors which are needed are stored in memory locations for which the factors are known, or they may be stored in the fixed registers 22 which are set aside therefore (such as the "60 Factor" hereinafter); in either event, the programmer may insert proper instructions so as to reach factors in the locations where he has placed them, in the usual way. In the exemplary process hereinafter, the tests and measurements will be performed only after the engine has reached a speed in excess of rated speed, such as high idle speed. Thus rated speed must be available as a factor. And, if the speed varies from the starting speed by more than relatively small speed limits, such as 100 rpm, the test must be begun again; thus, a factor indicative of 100 rpm must be available; the speed calculations may be done directly in terms of tooth timer counts; after preconverting speeds in rpms to equivalent tooth timer counts. In order to determine a temperature which is a substantial fraction of, or just below the rated thermostat temperature which is not to be exceeded for more than on the order of several minutes (e.g., 5 minutes) without terminating the measurements in a fault (referred to hereinafter as "T−5°"), and to determine a temperature on the order of several degrees in excess of rated temperature which is indicative of a thermostat that is stuck in the closed position (referred to hereinafter as "T+15°"), the rated thermostat temperature and these two temperature variations must be available as factors which can be calculated by subtraction therefrom and addition thereto, respectively. Similarly, the 2° temperature rise before the test, the 2° temperature drop for the test, and the 5 psi pressure drop for the test are all made available as factors in suitable storage locations or registers. All of these factors may be entered through the keyboard to memory or registers, or otherwise pre-established in registers as desired.

The speed measurements herein are made by the tooth timer 15, which senses the passage of teeth and records a count of the number of clock signals fed to the tooth timer on a tooth-to-tooth basis. The fraction of a revolution traversed as each tooth passes the sensor is simply the ratio of one divided by the total number of teeth. The number of teeth on the flywheel may be determined by any suitable method, some of which are disclosed in the aforementioned applications of Stick et al and of Pettingell et al; or engine specifications may provide the number of flywheel teeth (RGT). The time for that fraction of a revolution to occur is simply the counts of the tooth timer 15 divided by the frequency of clock signals fed to the tooth timer 15. Since the frequency of the clock feeding the timer is expressed in Hz, and speed is normally expressed in revolutions per minute, a factor of 60 must be employed in a well known fashion. To actually determine the speed from the counts provided by the tooth timer 15, the relationship is the ratio of one tooth to the total number of teeth, which is divided by the ratio of the counts to the frequency (the frequency in turn having to be first divided by 60 to yield a result in rpm's). When comparing the actual speed of the engine as determined by the tooth timer with predetermined speeds (such as a starting speed for thermostat measurement) directly in tooth timer counts, one can reverse the position of speed and counts in the relationships described hereinbefore and determine in advance the number of counts which the tooth timer will have when the engine has a predetermined speed. This is done generally by multiplying the frequency of the clock times 60, all of which is divided by the product of the total number of teeth on the flywheel and the desired starting speed in rpm.

During the time that the engine is accelerating toward high idle, additional factors may be predigested so as to be available during the testing. For instance, the figure of 100 rpm's to be added and subtracted from the starting speed at a later time to determine whether the current speed is within 100 rpm's of the starting speed, may be preconverted into tooth timer counts, which may be in accordance with the following exemplary instructions:

1. Display "Hi speed"
2. Load MEM (Freq) to A REG
3. Load MEM (RGT) to B REG
4. Divide
5. Load RSLT to A REG
6. Load MEM (100 RPM) to B REG
7. Divide
8. Load RSLT to B REG
9. Load 60 Factor to A REG
10. Multiply
11. Load RSLT to MEM (100 RPM)

Thus, instruction 11 has placed a tooth timer count equivalent to 100 rpm in the memory location designated for 100 rpm. Of course, it is not necessary to do this for every engine tested, so that once the processor has converted the 100 rpm's into equivalent tooth timer counts, such counts will be available in memory; or the counts may be loaded in the first place, if desired.

To determine the temperatures for the 5 minute duration (T−5°) and indicative of a stuck thermostat (T+15°), factors may be subtracted from and added to the rated thermostat temperature for the engine under test, in accordance with the following exemplary instructions:

12. Load MEM (Thermo T) to A REG
13. Load MEM (5°) to B REG
14. Subtract
15. Load RSLT to MEM (T−5°)
16. Load MEM (15°) to B REG
17. Add
18. Load RSLT to MEM (T+15°)

Instructions 12 through 18 have provided, in the example of a 175° thermostat which is used for illustrative purposes herein, the 170° temperature, over which the test cannot last for more than 5 minutes, and the 190° temperature over which the test will be terminated altogether.

For the 5 minute and 2 minute tests, the two interval timers may be preset in advance, as follows:

19. Load MEM (5 min) to 5 min Preset Reg
20. Load MEM (2 min) to 2 min Preset Reg Referring briefly to the data flow chart of FIG. 6, in which the numbers within circles are representative of exemplary instructions herein which correspond with the various boxes of the data flow, instructions 1–18 have caused the operator to advance the speed of the engine and have calculated some factors to be used in the test. So now the test is ready to begin by providing a tooth count which is equal to rated speed and reading speed in tooth counts to determine if rated speed has been achieved. The rated speed factor may be determined in the exemplary diagnostic system of FIG. 1 with the following instructions:

21. Load MEM (Freq) to A REG
22. Load MEM (RGT) to B REG
23. Divide
24. Load RSLT to A REG
25. Load MEM (Rated Spd) to B REG
26. Divide
27. Load RSLT to B REG
28. Load 60 Factor to A REG
29. Multiply
30. Load RSLT to B REG Then the system can simply monitor the tooth timer counts, continuously subtracting the predetermined counts from the tooth timer counts. Since counts are smaller for a higher speed, if the speed of the engine is above a predetermined speed (such as rated speed, about 2200 rpm), then the tooth timer counts will be less than the predetermined counts and this can be determined by doing a subtract and looking for a negative result as set forth in the following instructions:

31. Load Tooth timer to A REG
32. Subtract
33. Skip 1 if −
34. Branch to 31

When the speed exceeds rated speed, the result of the subtraction will be negative and instruction 31 will cause a skip to begin accumulating data for the diagnostic and test procedures, as indicated near the top of FIG. 6 for instructions 35–49, which may be as follows:

35. Load A REG to MEM (S1)
36. Turn off "Hi Spd"
37. Start 2 minute timer
38. A/D MPX to Coolant Pres
39. Start A/D
40. Skip 1 if complete
41. Branch to 40
42. Load A/D to MEM (P1)
43. A/D MPX to Coolant Temp
44. Start A/D
45. Skip 1 if complete
46. Branch to 45
47. Load A/D to MEM (T)
48. Load A/D to MEM (T1)
49. Load A/D to MEM (T2)

Then the first diagnostic test begins by determining whether the temperature of the coolant has yet reached 5° or so below the rated operating of the temperature of the thermostat, and the 5 minute related test, as indicated in FIG. 6 with respect to instructions 53 through 58, counter one having first been reset so as to be usable as a flag for the 5 minute timer having been started, as appears more fully in the following exemplary instructions:

50. Reset Counter 1
51. Load A/D to B REG
52. Load MEM (T-5°) to A REG
53. Subtract; Skip 1 if −
54. Branch to 58
55. Skip 2 if Ctr 1 = 1
56. Start 5 min timer
57. Branch to 62
58. Skip 1 if 5 min time out
59. Branch to 62
60. Display "Fault"
61. End Thus, during the first pass in which the coolant temperature exceeds 170°, instruction 55 will be negative so the five minute timer will be started, thereafter, whether the temperature remains above 170° or falls below 170°, the test to determine if 5 minutes have elapsed since the temperature first reached 170° will be made in instruction 58. If the time is up, instruction 60 ends the test with a fault display. But if not, the diagnostic tests proceed to instruction 62 which tests for a 2° temperature rise over each 2 minute time span, as follows:

62. Skip 1 if 2 min time out
63. Branch to 74
64. Load MEM (T2) to A REG
65. Load MEM (2°) to B REG
66. Add
67. Load RSLT to B REG
68. Load MEM (T) to A REG
69. Subtract
70. Skip 1 if +
71. Branch to 60
72. Load A REG to MEM (T2)
73. Start 2 min timer The next diagnostic test, which must be done as a condition precedent to making the actual thermostat opening test, is to check that the speed has remained substantially constant since the prior pressure reading was taken, and if not, to return to instruction 31 at the beginning of the test procedure so as to recommence the entire test and measurement procedure. This may be in accordance with the following exemplary instructions:

74. Load Tooth timer to MEM (S)
75. Load MEM (S1) to A REG
76. Load MEM (100 RPM) to B REG
77. Subtract
78. Load RSLT to A REG
79. Load MEM (S) to B REG
80. Subtract
81. Skip 2 if −
82. Display "Hi Spd"
83. Branch to 31

If instruction 81 shows a negative answer, this means that the current speed is higher than the previous speed (S1) minus 100 rpm; and now a similar test is made to be sure it's lower than the previous speed (S1) plus 100 rpm, with instructions which may be as follows:

84. Load MEM (S1) to A REG
85. Load MEM (100 RPM) to B REG
86. Add
87. Load RSLT to B REG
88. Load MEM (S) to A REG
89. Subtract
90. Skip 2 if −
91. Display "Hi Spd"
92. Branch to 31

If the speed is within 100 rpm's of the starting speed (S1), the actual temperatures and pressures used for the thermostat measurement will be made and one last diagnostic check, to be sure that the temperature hasn't exceeded a value over the thermostat setting (herein taken to be 15° higher than the thermostat setting) will be made, as follows:

93. A/D MPX to Coolant Pres
94. Start A/D
95. Skip 1 if complete
96. Branch to 95
97. Load A/D to MEM (P)
98. A/D MPX to Coolant Temp
99. Start A/D
100. Skip 1 if complete
101. Branch to 100
102. Load A/D to MEM (T)
103. Load A/D to A REG
104. Load MEM (T+15°) to B REG
105. Subtract; Skip 1 if +
106. Branch to 60

If the temperature is under 190°, a test is made to see if the current temperature is higher than the previous temperature, and if it is it is substituted for the previous temperature, indicating that the peak has not yet been reached; and similarly, the current pressure is compared with the previous pressure to see if it is higher than the previous pressure, and if it is, it becomes the previous pressure for subsequent testing, so that temperature and pressure drops are measured against the maximum temperature and maximum pressure previously sensed in each case. Obviously, before an actual drop is sensed, each temperature is being compared against itself and each pressure is being compared against itself; but once the temperature and/or pressure begins to decrease, they will be compared against previously acquired, higher temperatures or pressures, respectively. The temperature and pressure comparisons and exchanges to ensure the maximums may be in accordance with the following instructions:

107. Load MEM (T1) to A REG
108. Load MEM (T) to B REG
109. Subtract
110. Skip 1 if +
111. Load B REG to MEM (T1)
112. Load MEM (P1) to A REG
113. Load MEM (P) to B REG
114. Subtract
115. Skip 1 if +
116. Load B REG to MEM (P1)

And now the actual test for temperature drop, which if it fails, will then call for a test for pressure drop, can be performed; if both tests fail, the processing returns to instruction 53 to again perform all of the diagnostic checks and then make new comparisons, if everything is in order. When either a 2° temperature drop os a 5 psi pressure drop is sensed, the temperature stored in the T1 location of memory is the desired result, to wit, the measured operating temperature of the thermostat; this may be displayed if desired, and is available in the T1 location of memory for any further use thereof in diagnostic procedures, which form no part of the present invention. This may be in accordance with the following instructions:

117. Load MEM (T1) to A REG
118. Load MEM (2°) to B REG
119. Subtract
120. Load RSLT to A REG
121. Load MEM (T) to B REG
122. Subtract
123. Skip 1 if —
124. Branch to 133
125. Load MEM (P1) to A REG
126. Load MEM (5 psi) to B REG
127. Subtract
128. Load RSLT to A REG
129. Load MEM (P) to B REG
130. Subtract
131. Skip 1 if +
132. Branch to 53
133. Load MEM (T1) to Display
134. End Thus, from the foregoing exemplary instructions, as illustrated in FIG. 6, it can be seen that any variation in the speed which would render the pressure test invalid will cause the entire procedure to begin again. If 5 minutes elapse after the temperature reaches nearly the rated thermostat temperature, or if the temperature exceeds some temperature in excess of rated temperature, or if a gradient of at least 2° for every 2 minutes is not maintained, prior to sensing a temperature or pressure drop, the measurements of thermostat operation are not made and the testing ends in a fault condition. Otherwise, the present temperature is tested against the highest previous temperature and the present pressure is tested against the highest previous pressure, and when a suitable temperature or pressure drop is sensed, the highest previous temperature is recorded as a measurement of thermostat operation.

With temperature and pressure sensors mounted in positions substantially as shown in FIG. 4, the thermostat measurements and diagnostic tests are made as described hereinbefore. However, it should be understood that the pressure sensor 52 may in fact be mounted downstream of the thermostat 106, such as along its connection to the radiator 108 or even at the inlet to the pump 100. In such a case, a pressure rise will most likely be seen, and the corresponding instructions can be altered so as to look for a pressure rise; perhaps an adjustment in the number of psi of pressure rise used in the test may also be required. Similarly, if the temperature sensor 53 is located in the radiator path, it could sense a temperature rise rather than a temperature drop, as an indication of thermostat operation. The temperature and/or pressure rises or drops are sufficient if they comprise a variation in coolant parameter indicative of thermostat operation. However, if the viability diagnostics ensuring against stuck or marginal thermostat operation employing temperature are to be used, then a temperature sensor must also be mounted in the portion of the coolant system in which coolant is flowing prior to opening the thermostat, since it will be insensitive to temperature gradients or excessive temperatures prior to opening of the thermostat. So, if desired, one could mount a temperature sensor 53 as shown, and another temperature sensor in the radiator loop 108 which would be monitored for a temperature rise as the measurement of thermostat operation.

The temperature diagnostics, to assure against a stuck or laggardly thermostat, operate to prevent excessive time delays in the event that viable thermostat operation cannot be sensed, and also prevent an over-temperature condition if the thermostat is stuck closed. On the other hand, the speed test of instructions 81 and 90 is related almost exclusively to maintaining a pump speed which will not cause too great a pressure variation in itself. The actual thermostat measurements are illustrated herein as temperature drop and/or pressure drop, but these could equally be sensed as rises if the sensor therefor are mounted downstream of the thermostat in the radiator loop. Further, the pressure or time could be recorded upon sensing thermostat operation, if desired. Or, if the limits are sufficiently tight, only a pass/fail indication need be displayed. Also, a test involving only temperature or only pressure may utilize some of the precedent diagnostics therewith, if desired. In any system in which an over-temperature condition is automatically sensed, it would be possible to drop the T+15° test, if desired. By analysis of the functions described herein, it should be obvious that various of them may be selected without necessarily using all of them, in a fashion which may more nearly suit the particular needs of any implementation of the present invention. Also, the particular test limits (time, temperature, pressure, speed) may, of course, vary for some different coolant systems practicing the invention, the values given herein being exemplary only. And, the engine could be operated at other than high idle with a commensurate change in the time intervals herein.

Similarly, although the invention has been shown and described with respect to exemplary embodiments thereof, it should be understood by those skilled in the art that the foregoing and various other changes, omissions and additions in the form and detail thereof may be made therein and thereto without departing from the spirit and the scope of the invention.

Having thus described typical embodiments of our invention, that which we claim as new and desire to secure by Letters Patent of the United States is:

1. Apparatus for measuring the operation of the thermostat mounted in an engine cooling system with the engine running, comprising:
    pressure sensor means adapted to be disposed to sense the pressure of the coolant of the cooling system, and providing a pressure signal in response thereto;
    temperature sensor means adapted to be disposed to sense the temperature of the coolant in said cooling system and provide a temperature signal in response thereto; and
    processing apparatus comprising means operative in response to said temperature and to said pressure signals with all of said sensor means disposed as described hereinbefore for determining a variation in either of said signals indicative of thermostat operation.

2. Apparatus according to claim 1 wherein said processing apparatus further comprises:
    means for successively sampling and registering successively sampled values of said temperature signal, for successively sampling and registering successively sampled values of said pressure signal, for comparing successively sampled values of said temperature signal and of said pressure signal with previously sampled, registered values thereof, respectively, and for providing, in response to sensing a variation in values of said temperature signal or values in said pressure signal indicative of operation of the thermostat, one of said values as a measure of operation of said thermostat.

3. Apparatus for measuring the operation of the thermostat mounted in an engine cooling system with the engine running, comprising:
    pressure sensor means adapted to be disposed to sense the pressure of the coolant of the cooling system, and providing a pressure signal in response thereto;
    temperature sensor means adapted to be disposed to sense the temperature of the coolant in said cooling system and provide a temperature signal in response thereto;
    speed sensor means, including means adapted to be disposed to sense rotation of the engine, for providing a speed signal indicative of the speed of rotation of the engine;
    signal responsive means for providing in response to signals applied thereto a manifestation of thermostat operation; and
    processing apparatus comprising means operative in response to said pressure signal, said temperature signal and to said speed signal with all of said sensor means disposed as described hereinbefore for successively sampling all of said signals in an interspersed fashion, for continuously comparing successively sampled values of said pressure signals and of said temperature signals, respectively, and in response to variation in either of them by an amount sufficient to indicate thermostat operation, providing signals to said signal responsive means to cause it to provide a manifestation of thermostat operation, and for continuously comparing successively sampled values of said speed signal and in response thereto terminating said interspersed sampling in response to said speed signal values indicating an excessive variation in the speed of said engine.

4. Apparatus according to claim 3 wherein said processing apparatus comprises means for continuously comparing successively sampled values of said pressure signal and, in response to variation thereof by an amount sufficient to indicate thermostat operation, providing signals to said signal responsive means to cause it to provide a manifestation of thermostat operation and terminating said interspersed sampling.

5. Apparatus according to claim 3 wherein said processing apparatus comprises means for continuously comparing successively sampled values of said speed signal and in response thereto providing signals to said signal responsive means to cause it to provide a manifestation indicative of fault and terminating said interspersed sampling in response to said speed signal values indicating an excessive variation in the speed of said engine.

6. Apparatus according to claim 3 wherein said signal responsive means comprises output means for providing a visual manifestation.

7. Apparatus according to claim 3 wherein said processing apparatus further comprises:
    means for successively sampling and registering successively sampled values of said temperature signal, for successively sampling and registering successively sampled values of said pressure signal, for comparing successively sampled values of said temperature signal and of said pressure signal with previously sampled, registered values thereof, respectively, and for providing, in response to sensing a variation in values of said temperature signal or values in said pressure signal indicative of operation of the thermostat, one of said values as a measure of operation of said thermostat.

8. Apparatus for measuring the operation of the thermostat mounted in an engine cooling system having a thermostat bypass with the engine running, comprising:
sensor means adapted to be disposed for response to parameters of the coolant of the cooling system which are indicative of thermostat operation and indicative of the temperature of coolant circulating in the cooling system through the bypass, and for providing signals indicative thereof;
signal responsive means for providing in response to signals applied thereto a manifestation of thermostat operation; and
processing apparatus comprising means operative in response to the signals of said sensor means with said sensor means disposed as described hereinbefore for successively sampling signals of said sensor means, for comparing values of said signals indicative of thermostat operation and in response to a significant variation therein providing signals to said signal responsive means to cause it to provide a manifestation of the operation of said thermostat, and for comparing values of said signals indicative of temperature of the coolant circulating in the cooling system through the bypass and terminating said successive samplings in response to indications that the thermostat is stuck in one position.

9. Apparatus according to claim 8 wherein said processing apparatus comprises means for comparing values of said signals indicative of temperature of the coolant circulating in the cooling system through the bypass for indications that the thermostat is stuck in one position for providing signals to said signal responsive means to cause it to provide a manifestation of fault, and for terminating said successive samplings.

10. Apparatus according to claim 8 wherein said processing apparatus comprises means for successively sampling signals of said sensor means, for comparing values of said signals indicative of thermostat operation to provide signals to said signal responsive means to cause it to provide a manifestation of the operation of said thermostat, and for terminating said successive samplings in response thereto.

11. Apparatus according to claim 8 wherein said processing means includes means for comparing values of said signals indicative of temperature of the coolant circulating in the cooling system through the bypass and for terminating said successive samplings in response to said temperature values indicating a failure of said temperature to maintain a given temperature rise per unit of time.

12. Apparatus according to claim 8 wherein said processing means includes means for comparing values of said signals indicative of temperature of the coolant circulating in the cooling system through the bypass and for terminating said successive samplings in response to said temperature values indicating that the coolant temperature has exceeded the rated temperature of the thermostat by on the order of several degrees.

13. Apparatus according to claim 8 wherein said processing means includes means for comparing values of said signals indicative of temperature of the coolant circulating in the cooling system through the bypass and for terminating said successive samplings in response to said successive samplings having continued over a period of time of on the order of several minutes after said temperature values indicate said temperature has first reached a given temperature which is a substantial fraction of the rated temperature of the thermostat.

14. Apparatus according to claim 8 further comprising:
speed sensor means, including means adapted to be disposed to sense angular rotation of the engine, for providing a speed signal indicative of the rotational speed of the engine; and
wherein said processing apparatus comprises means for also successively sampling said speed signal, for recording an initial value of said speed signal for comparing subsequent values of said speed signal with said initial value, and for terminating said process in response to said speed signal values indicating a failure of the engine to remain running within predetermined limits of the speed indicated by said initial value.

15. Apparatus for measuring the operation of the thermostat mounted in an engine cooling system having a thermostat bypass with the engine running, comprising:
sensor means adapted to be disposed for response to the temperature of coolant circulating in the cooling system through the bypass and providing a temperature signal indicative thereof;
pressure sensor means adapted to be disposed for response to the pressure of the coolant circulating in the cooling system with the thermostat closed and providing a pressure signal indicative thereof; and
processing apparatus operative in a repetitive process in response to said sensor means with said sensors disposed for response as described hereinbefore, for successively sampling all of said signals, for comparing successively sampled values of said signals, for providing, in response to sensing either a variation in said temperature signal values or a variation in said pressure signal values indicative of thermostat operation, a manifestation of thermostat operation and terminating said process, and for otherwise terminating said process in response to successively samples values of said temperature indicating a failure of said temperature to maintain a given temperature rise per unit of time, said temperature exceeding the rated temperature of the thermostat by on the order of several degrees, or said process having continued over a period of time of on the order of several minutes after said temperature first reaches a given temperature which is a substantial fraction of the rated temperature of the thermostat.

16. In the method of measuring the operation of the thermostat mounted in the cooling system of an engine, the steps of:
operating the engine so that the temperature of the coolant in the cooling system will increase from a temperature below the rated thermostat temperature;
monitoring parameters of the coolant in the cooling system including temperature and pressure; and
providing, in response to a change in one of said parameters sufficient to indicate thermostat operation, an indication of one of said parameters.

17. The method according to claim 16 wherein said monitoring step comprises keeping track of the most extreme value in one sense of temperature and the most extreme value in one sense of pressure and comparing successive values of temperature and of pressure against the most extreme values thereof previously noted;

and said last step comprises sensing a variation in either parameter of a sense opposite to said first sense as an indication of thermostat operation.

18. The method according to claim 16 additionally comprising monitoring the temperature of the coolant circulating in the engine and terminating the method in the event that said temperature indicates that the thermostat is stuck.

19. The method according to claim 16 including the additional steps of:

monitoring the temperature of the coolant in that portion of the cooling system separated from the radiator thereof by the thermostat; and comparing successive values of said temperature and terminating the method in the event that said temperature fails to maintain a temperature rise of a given magnitude per unit of time.

20. The method according to claim 16 including the additional steps of monitoring the temperature of the coolant in that portion of the cooling system separated from the radiator thereof by the thermostat; and comparing successive values of said temperature and terminating the method in the event that said temperature exceeds the rated thermostat temperature by on the order of several degrees.

21. The method according to claim 16 including the additional steps of monitoring the temperature of the coolant in that portion of the cooling system separated from the radiator thereof by the thermostat; and comparing successive values of said temperature and terminating the method in the event that the method continues over a period of time on the order of several minutes after said temperature first reaches a given, substantial fraction of the rated thermostat temperature for the cooling system under test.

22. In the method of monitoring a parameter of an engine cooling system having a thermostat bypass, to sense the operation of a thermostat mounted therein with the engine running, the steps of:

monitoring the temperature of coolant circulating in the cooling system through the thermostat bypass; and terminating the method in the event that said temperature indicates that the thermostat is stuck.

23. In the method of monitoring a parameter of an engine cooling system having a thermostat bypass, to sense the operation of a thermostat mounted therein with the engine running, the steps of:

monitoring the temperature of coolant circulating in the cooling system through the thermostat bypass; and terminating the method in the event that said temperature fails to maintain a temperature rise of a given magnitude per unit of time.

24. In the method of monitoring a parameter of an engine cooling system having a thermostat bypass, to sense the operation of a thermostat mounted therein with the engine running, the steps of:

monitoring the temperature of coolant circulating in the cooling system through the thermostat bypass; and terminating the method in the event that said temperature exceeds the rated thermostat temperature by on the order of several degrees.

25. In the method of monitoring a parameter of an engine cooling system having a thermostat bypass, to sense the operation of a thermostat mounted therein with the engine running, the steps of:

monitoring the temperature of coolant circulating in the cooling system through the thermostat bypass; and terminating the method in the event that the method continues over a period of time on the order of several minutes after said temperature first reaches a given, substantial fraction of the rated thermostat temperature for the cooling system under test.

* * * * *